United States Patent
Roth et al.

(10) Patent No.: US 9,311,415 B2
(45) Date of Patent: Apr. 12, 2016

(54) GENERATING CONTACT SUGGESTIONS

(71) Applicant: Google Inc., Mountain View, CA (US)

(72) Inventors: Maayan Roth, Tel Aviv (IL); Ron Merom, Qiryat Bialik (IL); Assaf Ben-David, Jerusalem (IL); Ari J. Leichtberg, Zichron Yaakov (IL); Natan Leiser, Binyamina (IL); Ilan M. Horn, Givat-Ada (IL); David Deutscher, Ra'anana (IL); Guy Flysher, Petah Tikva (IL); Yossi Matias, Tel Aviv (IL)

(73) Assignee: GOOGLE INC., Mountain View, CA (US)

( * ) Notice: Subject to any disclaimer, the term of this patent is extended or adjusted under 35 U.S.C. 154(b) by 58 days.

(21) Appl. No.: 14/256,762

(22) Filed: Apr. 18, 2014

(65) Prior Publication Data

US 2014/0222815 A1    Aug. 7, 2014

Related U.S. Application Data

(63) Continuation of application No. 12/762,081, filed on Apr. 16, 2010, now Pat. No. 8,738,634.

(60) Provisional application No. 61/302,042, filed on Feb. 5, 2010.

(51) Int. Cl.
*G06F 17/30* (2006.01)
*H04L 12/58* (2006.01)

(52) U.S. Cl.
CPC ...... *G06F 17/30867* (2013.01); *G06F 17/3097* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 8,554,868 B2 | 10/2013 | Skyrm et al. | |
| 8,555,185 B2 | 10/2013 | Louch et al. | |
| 8,893,038 B2 | 11/2014 | Bennah et al. | |
| 8,910,067 B1 | 12/2014 | Anderson | |
| 2005/0021624 A1 | 1/2005 | Herf et al. | |
| 2005/0052685 A1 | 3/2005 | Herf et al. | |
| 2005/0108402 A1 | 5/2005 | Colson et al. | |
| 2006/0176831 A1 | 8/2006 | Greenberg et al. | |
| 2006/0277210 A1 | 12/2006 | Starbuck | |
| 2007/0124737 A1 | 5/2007 | Wensley et al. | |

(Continued)

OTHER PUBLICATIONS

Balasubramanyan, Cut Once: A Thunderbird Extension for Recipient Prediction and Leak Detection, Apr. 6, 2008, 5 pgs.

(Continued)

*Primary Examiner* — Son T Hoang
(74) *Attorney, Agent, or Firm* — Morgan, Lewis & Bockius LLP (57) ABSTRACT

In some implementations, a method includes, at a computing device, identifying a first recipient of a draft electronic communication prepared by a user. A is score is obtained for a second recipient using respective messages in a plurality of historical messages in a user account associated with the user. The second recipient is a sender or receiver of the respective messages. There is suggested to a user, second recipient for the draft electronic communication in accordance with a condition that both the first recipient and the second recipient shared a single electronic communication and the score for the second recipient satisfies a predefined score threshold. The single electronic communication was communicated at a time prior to identifying the first recipient.

20 Claims, 7 Drawing Sheets

(56) References Cited

U.S. PATENT DOCUMENTS

| | | | |
|---|---|---|---|
| 2007/0294428 A1* | 12/2007 | Guy et al. | 709/245 |
| 2008/0250114 A1 | 10/2008 | Dubovsky et al. | |
| 2009/0037413 A1* | 2/2009 | Castell | G06Q 30/02 707/999.1 |
| 2009/0150947 A1 | 6/2009 | Soderstrom | |
| 2009/0177744 A1 | 7/2009 | Marlow et al. | |
| 2009/0228555 A1 | 9/2009 | Joviak et al. | |
| 2010/0017194 A1* | 1/2010 | Hammer et al. | 704/9 |
| 2010/0017478 A1* | 1/2010 | Mejia et al. | 709/206 |
| 2010/0107115 A1 | 4/2010 | Sareen et al. | |
| 2010/0205537 A1 | 8/2010 | Knighton et al. | |
| 2010/0306185 A1* | 12/2010 | Smith | G06Q 10/107 707/709 |
| 2011/0083079 A1* | 4/2011 | Farrell et al. | 715/739 |

OTHER PUBLICATIONS

Carvalho, Cut Once—A Thunderbird Extension for Recipient Prediction and Leak Detection, Jan. 19, 2008, 3 pgs.

Carvalho, Ranking Users for Intelligent Message Addressing, ECIR'08 Proceedings of the IR Research, 30th European Conf. on Advances in Information Retrieval, Berlin, 2008, 12 pgs.

TechHit, SimplyFile—Intelligent filing assistance for Microsoft Outlook, 2008, 2 pgs.

Google Inc., Notification of the Grant of Patent Right for Invention, CN 201080013718.4, Mar. 2, 2015, 1 pg.

* cited by examiner

GENERATING CONTACT SUGGESTIONS

RELATED APPLICATIONS

This application is a continuation of U.S. application Ser. No. 12/762,081, filed Apr. 16, 2010, which claims the benefit to U.S. Provisional Application Ser. No. 61/302,042, filed Feb. 5, 2010.

Both of the above-identified patent applications are hereby incorporated by reference it their entireties.

TECHNICAL FIELD

The disclosed embodiments relate generally generating a contact suggestion based on an implicit social network, and more particularly generating a contact suggestion for a draft communication based on previously added contacts.

BACKGROUND

One benefit of many online communication channels over offline methods is that they enable communication among groups of people, rather than restricting communication to be peer-to-peer. Email is just one format that supports group conversations, but there are many others, such as photo- and link-sharing, and collaborative document editing. In fact, group communication is prevalent. An analysis of the Google Mail email network shows that over 10% of emails are sent to more than one recipient, and over 4% of emails are sent to 5 or more recipients. Within enterprise domains, group communication is even more critical. An analysis of the email network of Google employees showed that over 40% of emails are sent to more than one recipient, and nearly 10% are sent to 5 or more recipients.

As opposed to broadcast-style media, such as blogs and micro-blogging platforms like Twitter, the information communicated by an individual to a limited group is generally carefully targeted, and may be private. The recipient lists for small-group communications such as emails are selectively constructed by the message senders. Users tend to communicate repeatedly with the same groups of contacts.

Despite the prevalence of group communication, users do not often take the time to create and maintain custom contact groups. A survey of mobile phone users in Europe showed that only 16% of users have created custom contact groups on their mobile phones. See, M. Kuhn et al., "Cluestr: Mobile social networking for enhanced group communication," In *Proceedings of the International Conference on Supporting Group Work (GROUP)*, May 2009. In user studies, users explain that group-creation is time consuming and tedious. Additionally, groups change dynamically, with new individuals being added to multi-party communication threads and others being removed. Static, custom-created groups can quickly become stale, and lose their utility. Consequently, these static custom-created groups have limited utility in determining contacts to suggest for a draft message.

SUMMARY

This application introduces the notion of the implicit social graph, which is the social network that is defined by interactions between users and their contacts and groups. We differentiate the implicit social graph from explicit social graphs that are formed by users manually adding other individuals as "Friends" (e.g., custom-created groups). The implicit social graph is a weighted graph, where edge weights are determined by the frequency, recency, and direction of interactions between users and their contacts and groups. This method provides more accurate contact suggestions by taking into account group interactions, as well as peer-to-peer interactions.

The implicit social graph is used to identify clusters of contacts who form groups that are meaningful and useful to each user, without considering the content of interactions. Additionally, because many communications networks (e.g., email networks) are private, the present application does not consider any friend-of-friend ties, either when computing edge weights for the graph, or when computing contact clusters.

This application describes a friend-suggestion algorithm that, given a user's social network with weighted edges and an initial seed of a few contacts, generates contact suggestions by building a custom contact group that accurately expands the seed data. It should be understood that, although the following discussion centers around an email network, the system and method described herein are applicable to any implicit social graph that is formed by interactions between users and their contacts.

BRIEF DESCRIPTION OF THE DRAWINGS

Like reference numerals refer to corresponding parts throughout the drawings.

DESCRIPTION OF EMBODIMENTS

Figure 1:
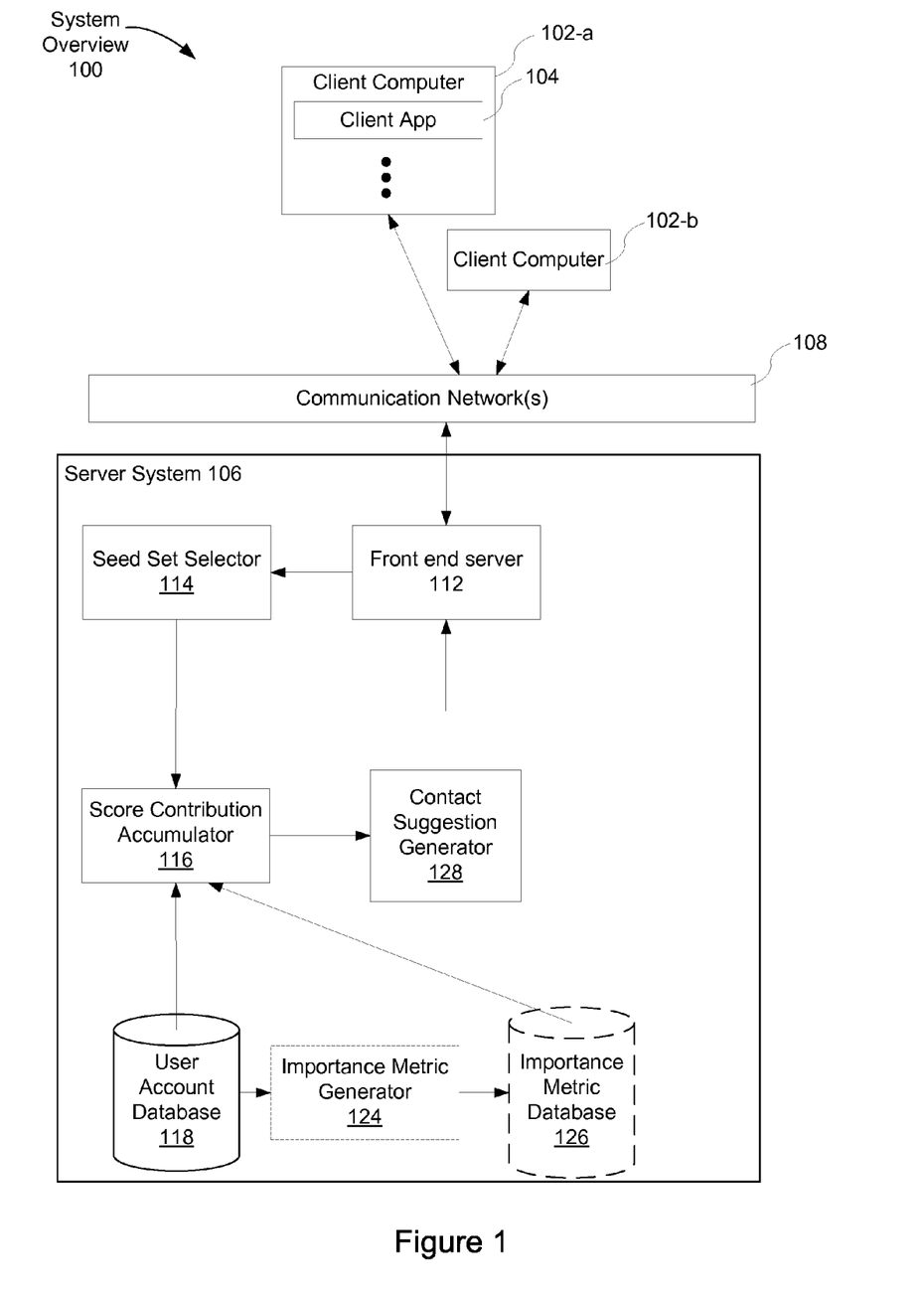
FIG. 1 illustrates an overview of a distributed client server system in accordance with some embodiments.

FIG. 1 is a block diagram of a distributed client-server computing system 100 including a server system 106 according to some embodiments of the present disclosure. The server system 106 is connected to a plurality of client computers 102 through one or more communication networks 108.

The client computer 102 (sometimes called a "client system," or "client device" or "client") may be any computer or device through which a user of the client computer 102 can submit service requests to and receive messaging services or other services from the server system 106. Examples of client computers 102 include, without limitation, desktop computers, laptop computers, tablet computers, mobile devices such as mobile phones, personal digital assistants, set-top boxes, or any combination of the above. A respective client computer 102 may contain at least one client application 104 for submitting requests to the server system 106. For example, the client application 104 can be a web browser or other type of application that permits a user to search for, browse, and/or use information (e.g., web pages and web services) that is accessible through the communication network 108

The communication network(s) 108 can be any wired or wireless local area network (LAN) and/or wide area network (WAN), such as an intranet, an extranet, the Internet, or a combination of such networks. In some embodiments, the communication network 108 uses the HyperText Transport Protocol (HTTP) and the Transmission Control Protocol/Internet Protocol (TCP/IP) to transport information between different networks. The HTTP permits client devices to access various information items available on the Internet via the communication network 108. The various embodiments of the present disclosure, however, are not limited to the use of any particular protocol.

In some embodiments, the server system 106 includes a front end server 112, a seed set selector 114, a score contribution accumulator 116, a user account database 118, an importance metric generator 124, an importance metric database 126, and a contact suggestion generator 128.

The front end server 112 is configured to receive data from a client computer 102. In some embodiments the data is a message or other communication including a plurality of contacts (e.g., recipients and senders), and is stored in a user account database 118. For example, a message or other communication may include one or more of: an email message, a chat message, a voicemail message, a calendar invitation, a document sharing invitation, a document sharing communication using a collaborative document processing application, a video communication, a social network communication (e.g., wall posting, announcement, status update or reply to one of the aforementioned communications).

In some embodiments seed data including one or more contacts is received by the server system 106 from the client computer 102, and the seed data is sent from the front end server 112 to the seed set selector 114, where at least a subset of the contacts are selected as the seed set. The seed set is sent to the score contribution accumulator 116, which uses data from the user account database 118 (e.g., groups of contacts who were recipients or senders of messages or other communications in the user account database) to generate scores for each of the contacts in the groups of contacts. In some embodiments, an importance metric generator 124 determines a value indicative of the importance of one of the messages or other communications in the user account database 118 to the user (e.g., messages that were sent by the user, messages that were sent directly to the user instead of as a CC or BCC, and messages that were sent recently), and stores the importance metric values in an importance metric value database 126. In some embodiments the values from the importance metric database are used by score contribution accumulator 116 to weight the score contributions of each group of contacts to the generated score for a contact.

Once the scores for the contacts in the seed set have been determined by the score contribution accumulator 116, the contact suggestion generator 128 receives the generated scores from the score contribution accumulator 116 and generates suggestions including contacts from the groups of contacts (e.g., the suggestions include contacts to add to the message or contacts to remove from the message). It should be understood that, in some circumstances no contact suggestions are generated for a message. The front end server 112 receives the suggestions and provides the suggestions to the client computer 102 associated with the received data (e.g., the original request for suggestions) through the communication network 108. While the modules and data structures used to generate the contact suggestions have been illustrated above in the server system 106, it should be understood that, in accordance with some embodiments, analogous modules and data structures which are also used to generate the contact suggestions are located at the client computer 102 instead of, or in addition to, the modules and data structures shown in the server system 106 above.

Figure 2:
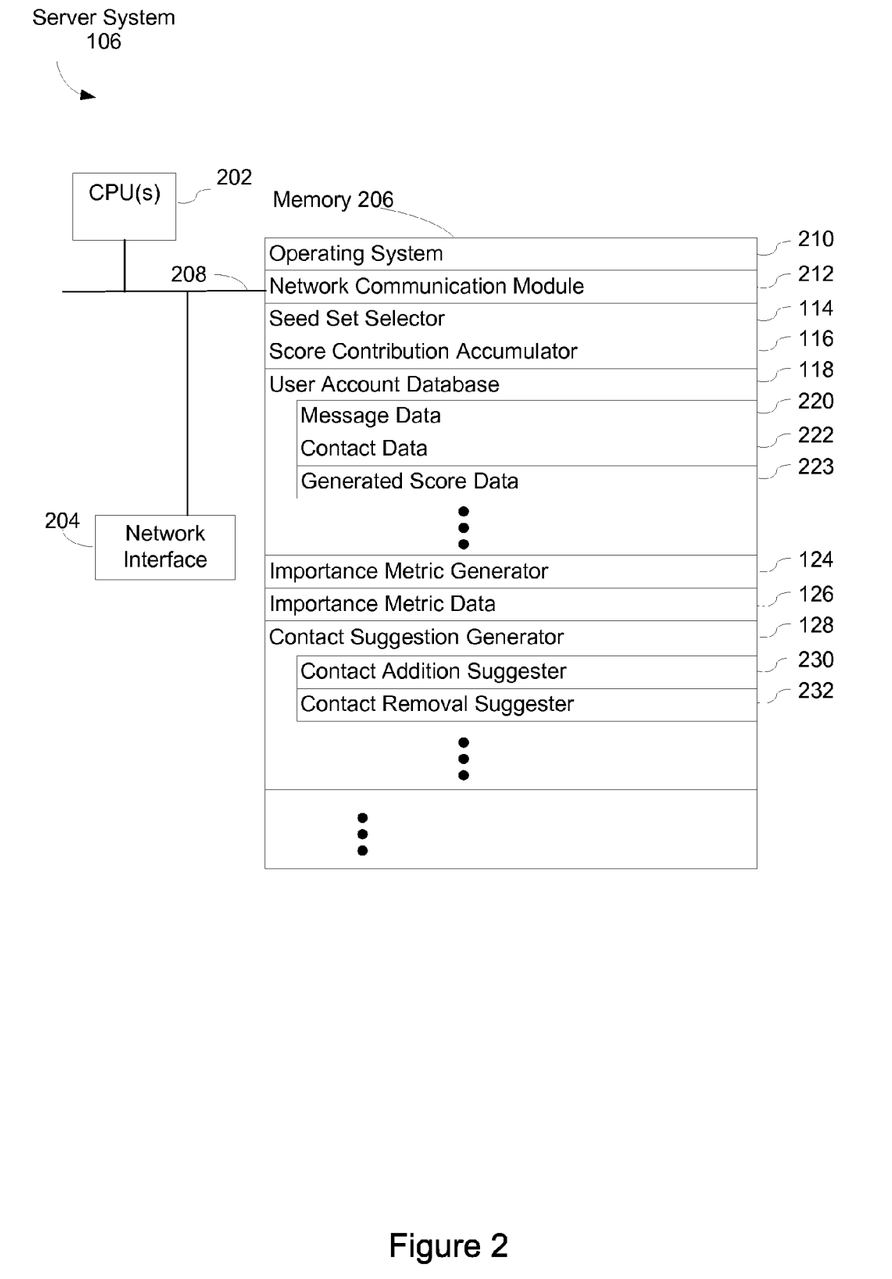
FIG. 2 is a block diagram illustrating a server system in accordance with some embodiments.

FIG. 2 is a block diagram illustrating a server system 106 in accordance with one embodiment of the present disclosure. The server system 106 typically includes one or more processing units (CPU's) 202 for executing modules, programs and/or instructions stored in memory 206 and thereby performing processing operations; one or more network or other communications interfaces 204; memory 206; and one or more communication buses 208 for interconnecting these components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a computer readable storage medium. In some embodiments, memory 206 or the computer readable storage medium of memory 206 stores the following programs, modules and data structures, or a subset thereof:

- an operating system 210 that includes procedures for handling various basic system services and for performing hardware dependent tasks;
- a network communication module 212 that is used for connecting the client computer 106 to other computers via the one or more communication network interfaces 204 (wired or wireless) and one or more communication networks, such as the Internet, other wide area networks, local area networks, metropolitan area networks, and so on;
- a seed set selector 114, for selecting one or more of the contacts from the seed data;
- a score contribution accumulator 116, for aggregating scores for contacts in the group of contacts;
- a user account database 118, for storing user data such as message data 220 for messages associated with user account(s), contact data 222 for contacts associated with user account(s), and generated score data 223 generated by the score contribution accumulator 116; optionally, the user account database 118 is stored in multiple tables or databases, with different portions of the user account database 118 (e.g., message data 220 and contact data 222 and score data 223) being stored in different tables or databases;
- an importance metric generator 124, for generating values that are indicative of the importance of a group of contacts to the user account;
- an importance metric database 126, for storing importance metric data, for use by the score contribution accumulator 116;
- a contact suggestion generator 128, for generating contact suggestions based on the generated score data, in some embodiments, the contact suggestion generator 128 also includes a contact addition suggester 230 for suggestion contacts to add to messages and/or a contact removal suggester 232 for suggesting contacts to remove from messages.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a "server system," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a server system and how features are allocated among them will vary from one implementation to another, and may depend in part on the amount of data traffic that the system must handle during peak usage periods as well as during average usage periods.

Figure 3:
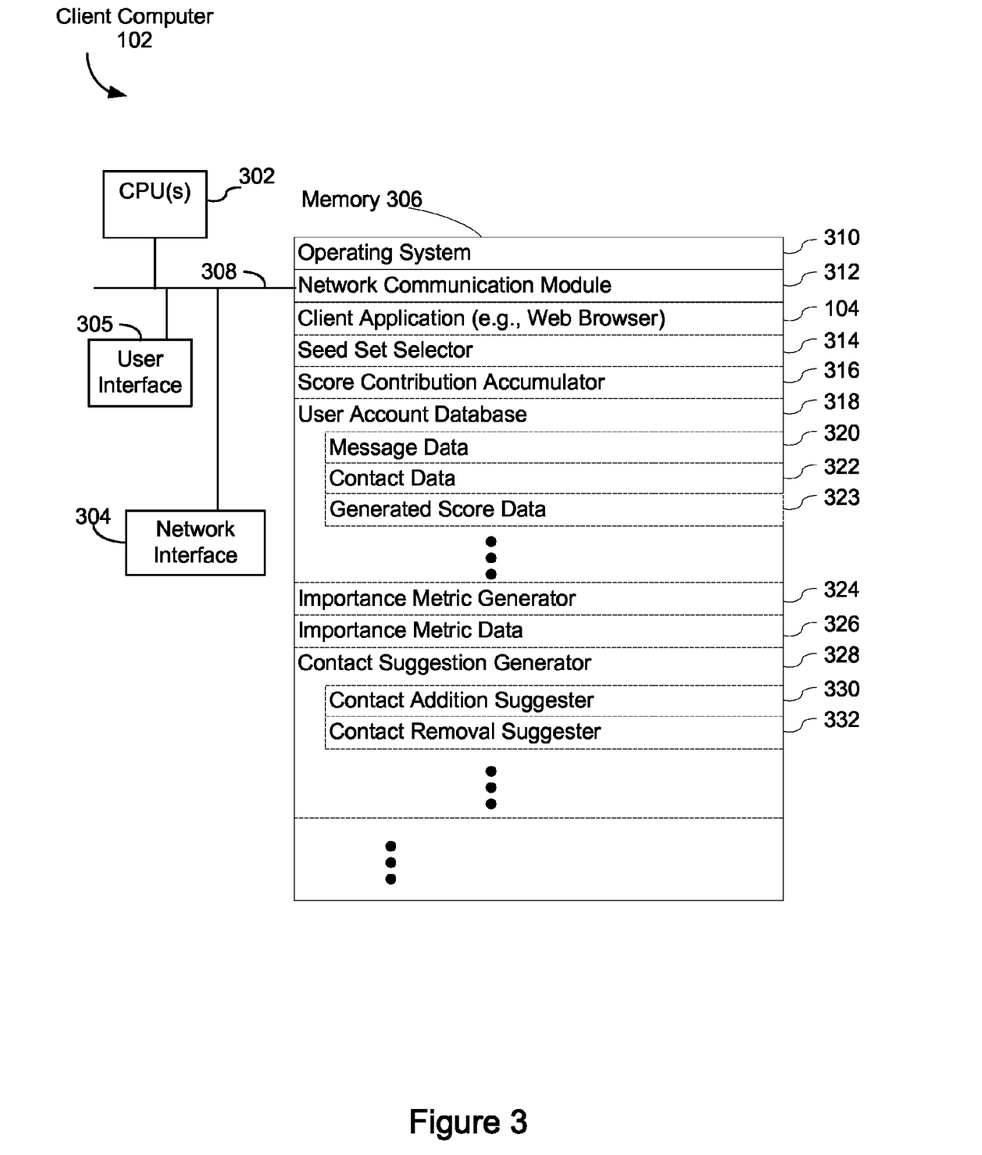
FIG. 3 is a block diagram illustrating a client computer in accordance with some embodiments.

FIG. 3 is a block diagram illustrating a client computer 102 in accordance with one embodiment of the present disclosure. The client computer 102 typically includes one or more processing units (CPU's) 302 for executing modules, programs and/or instructions stored in memory 306 and thereby performing processing operations; one or more network or other communications interfaces 304; memory 306; and one or more communication buses 308 for interconnecting these components. The client computer 102 optionally may include a user interface 305 comprising a display device and a keyboard, mouse, touch-sensitive surface or other input device. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a computer readable storage medium. In some embodiments, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the client computer 102 to other computers via the one or more communication network interfaces 304 (wired or wireless) and one or more communication networks, such as the Internet, other wide area networks, local area networks, metropolitan area networks, and so on;
- a client application 104, for rendering messages to the user of the client and receiving input from the user (e.g., addition or removal of contacts from a draft message or other communication);
- optionally, a seed set selector 314, for selecting one or more of the contacts from the seed data;
- optionally, a score contribution accumulator 316, for aggregating scores for contacts in the group of contacts;
- optionally, a user account database 318, for storing user data such as message data 320 for messages associated with user account(s), contact data 322 for contacts associated with user account(s), and generated score data 323 generated by the score contribution accumulator 316;
- optionally, an importance metric generator 324, for generating values that are indicative of the importance of a group of contacts to the user account;
- optionally, an importance metric database 326, for storing importance metric data, for use by the score contribution accumulator 316;
- optionally, a contact suggestion generator 328, for generating contact suggestions based on the generated score data, in some embodiments, the contact suggestion generator 328 also includes a contact addition suggester 330 for suggestion contacts to add to messages and/or a contact removal suggester 332 for suggesting contacts to remove from messages.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Characteristics of the Email Implicit Social Graph

The Google Mail implicit social graph is composed of billions of distinct nodes, where each node is an email address. Optionally, the implicit social graph also includes nodes for one or more additional online identifiers of a user (e.g., chat message identifiers and social network identifiers, etc.) and/or one or more additional offline identifiers (e.g., phone numbers and residential addresses, etc.). In some embodiments, nodes include identifiers that are retrieved from public sources. For example, identifiers associated with public user profiles for a social networking service will be collected and edges can be generated between these nodes based on public associations (e.g., public follower lists, public communications, etc.) between identifiers. For example, GOOGLE BUZZ user identifiers can serve as nodes and public announcements posted by a GOOGLE BUZZ user can serve as edges connecting the identifier of the user to identifiers of the contacts (e.g., "followers") of the user.

Additionally, it should be understood that in some embodiments, one or more of the nodes can be linked (e.g., treated as a single node). For example if a single user has an email address and a GOOGLE BUZZ identifier that is distinct from the email address, node associated with the email address and the GOOGLE BUZZ identifier can be linked so that they are treated as a single node for the purposes of determining an implicit social graph. The information linking one or more of the nodes can be collected from pubic sources (e.g., public user profiles) or from private sources (e.g., entered by a user explicitly).

Edges are formed by the sending and receiving of email messages and, optionally, other types of communications as well (e.g., including one or more of a chat message, a voicemail message, a calendar invitation, a document sharing invitation, a document sharing communication using a collaborative document processing application, a video communication, a social network communication). In some embodiments, as used herein, an email message sent from a user to a group of several contacts forms a single edge. In some embodiments, a chat message from a user to a contact forms a single edge from the user to the contact. A social network communication (e.g., an announcement such as a "wall post" or a "tweet") is represented as a multiple distinct edges from each contact that is able to view the social network communication to the user that published the social network communication. In some embodiments, edges have directionality, and the multiple distinct edges used to represent the social network are edges that are directed from the respective contacts to the user. In some embodiments, a social network communication that includes a mention of a particular contact (e.g., an announcement that uses the "@username" syntax to direct an announcement to a particular contact) would form an edge (e.g., a bi-directional edge) between the user and the particular contact.

A plurality of these edges and nodes can be combined to form a hypergraph. A hypergraph composed of all of the edges leading into or out of a single user node is that user's egocentric network. Each hyperedge is called an implicit group (also referred to as a "group of contacts," throughout), even though it may consist of a single contact. On average, a typical 7-day active user has 350 implicit groups in his egocentric network, with groups containing an average of 6 contacts. Note that this does not imply that the average user has thousands of distinct contacts. Rather, each implicit group is a unique combination of one or more contacts with whom the user has interacted.

Edges in the implicit social graph have both direction and weight. The direction of an edge is determined by whether it was formed by an outgoing interaction sent by the user, or an incoming interaction received by the user. A single edge may be both outgoing and incoming, if the user has both sent and received interactions from the implicit group. The weight of an edge is determined by the recency and frequency of any interactions between the user and the group. As described in greater detail below, one metric for computing edge weight, which is called Interactions Rank (also referred to as an "importance metric," throughout). In accordance with some embodiments, edge weight is an important indicator of the strength of the relationship between the user and a particular group. In the remainder of this document, the terms edge weight, group weight, and group importance are used interchangeably.

In accordance with some of the embodiments described herein, sharp distinction is drawn between each user's egocentric network and the global or sociocentric network that is formed by combining the networks of all users. In accordance with some embodiments, the present algorithm is restricted to look only at a single user's egocentric network during friend suggestion. By showing users suggestions based only on their local data, user privacy is protected and the system avoids exposing connections between the user's contacts that might not otherwise have been known to him.

Friend Suggest

It should be understood that, although users are reluctant to expend the effort to create explicit contact groups, they nonetheless implicitly cluster their contacts into groups via their interactions with them. For example, while a user may have multiple, possibly overlapping, subgroups of coworkers with whom he exchanges emails, he is unlikely to include his family members in those interactions. The Friend Suggest algorithm, described in this section, detects the presence of implicit clustering in a user's egocentric network by observing groups of contacts who are frequently present as co-recipients in the same email threads. The input to Friend Suggest is a seed (e.g., also referred to as a "seed set," throughout), which is a small set of one or more contacts that have been labeled by the user as belonging to a particular group. Given this seed, Friend Suggest finds other contacts in the user's egocentric network that are similar to the seed, meaning that they are present in the same implicit clusters. Friend Suggest also returns a score for each suggested contact, indicating the strength of its fit to the existing seed.

Interactions Rank (i.e., "Importance Metric")

The first requirement of the Friend Suggest algorithm is an implicit social graph with edges whose weights represent the relationship strength between a user and his implicit groups. Edge weights are computed so as to satisfy the following three criteria:

1. Frequency: Groups with which a user interacts frequently are more important to the user than groups with which he interacts infrequently.

2. Recency: Group importance is dynamic over time.

3. Direction: Interactions that the user initiates are more significant than those he did not initiate.

In some embodiments, additional optional criteria may be used to further modify the edge weights, including, for example:

4. Contact importance metric: Groups that include a particularly important contact (e.g., a "V.I.P.—very important person") are typically more important to the user than groups that do not include any important contacts. Thus, as one example of adjusting edge weight based on a contact importance metric, a group that includes one or more particularly important contacts could be given a greater edge weight than groups that do not include any particularly important contact. The contact importance metric for a respective contact of a user may be determined by other information about the user's relationships (e.g., relationships explicitly specified by the user, a number of links between the user and the respective contact, etc.) or by global information about the contact's position within the sociocentric graph.

Regarding recency, it should be understood that a group with which the user is actively interacting now is more important than one with which the user last interacted a year ago. Overall, recent interactions should contribute more to group importance than interactions in the past. Additionally, it should be understood that receiving an email from a contact (i.e., a passive interaction) is a weaker signal of closeness than the active interaction of sending an email to that contact. In some embodiments spammer contacts, (e.g., contacts from whom the user receives many emails but to whom he sends none) are ranked very low in importance.

To satisfy these criteria, an Interactions Rank, (i.e., an importance metric) is computed by summing the number of emails exchanged between a user and a particular implicit group, weighting each email interaction as a function of its recency. Interaction weights decay exponentially over time, with the half-life, $\lambda$, serving as a tunable parameter. An additional parameter that can be tuned in Interactions Rank is $\omega_{out}$, the relative importance of outgoing versus incoming emails.

Interactions Rank (sometimes abbreviated IR) is computed over a set of email interactions $I=\{I_{out}, I_{in}\}$, according to the following equation:

$$IR \leftarrow \omega_{out} \sum_{i \in I_{out}} \left(\frac{1}{2}\right)^{\frac{t_{now}-t(i)}{\lambda}} + \sum_{i \in I_{in}} \left(\frac{1}{2}\right)^{\frac{t_{now}-t(i)}{\lambda}}$$

where $I_{out}$ is the set of outgoing interactions between a user and a group, and $I_{in}$ is the set of incoming interactions, $t_{now}$, is the current time, and t(i) is the timestamp of an interaction i∈I. Note that according to this equation, an interaction from the current time has a contribution of 1 to a group's Interactions Rank, whereas an interaction from one half-life λ ago contributes ½ and so on.

It should be understood that, in accordance with some embodiments, Interactions Rank weights interactions according to their timestamp, rather than sorting interactions in chronological order, and weighting them on an exponentially decaying scale computed over their ordinal rank. Additionally, in accordance with some embodiments, the Interactions Rank takes into account the direction of each interaction.

It should be noted that Interactions Ranks do not easily allow for comparisons across several users. A very active user, who sends and receives many emails per day, will have overall higher Interactions Ranks for his implicit groups than a relatively inactive user. However, within a single user's egocentric network, Interactions Rank allows for a clean ordering of the user's implicit groups by estimated relationship strength. In accordance with some embodiments, other signals of importance are incorporated into the Interactions Rank (e.g., the percentage of emails received from a contact that the user chooses to read).

Core Routine

The core routine of the Friend Suggest algorithm, EXPAND-SEED is shown in Table 1.

TABLE 1

Core algorithm for suggesting contacts that expand a
particular seed, given a user's contact groups.

function EXPANDSEED(u, $\mathcal{S}$):
  input: u, the user
    $\mathcal{S}$, the seed
  returns: $\mathcal{F}$, the friend suggestions
  1. $\mathcal{G}$ ← GetGroups(u)
  2. $\mathcal{F}$ ← ∅
  3. for each contact g ∈ $\mathcal{G}$:
    4.   for each contact c ∈ g, c ∉ $\mathcal{S}$:
    5.     if c ∉ $\mathcal{F}$:
    6.       $\mathcal{F}$[c] ← 0
    7.     $\mathcal{F}$[c] ⊕ UPDATESCORE(c, $\mathcal{S}$, g)

The EXPANDSEED function takes as inputs a user, u (i.e., a user that is associated with a user account such as an email account), who is the mailbox owner of a single egocentric network in the implicit social graph, and a seed, S (i.e., the "seed set" of contacts used by the computer system to generate the contact suggestions, as described in greater detail below), consisting of a set of contacts that make up the group to be expanded. EXPANDSEED returns a set of friend suggestions, F (i.e., the "one or more suggested contacts" as described in greater detail below), where each suggestion is a contact in u's egocentric network, along with a score.

Each contact's score indicates the algorithm's prediction for how well that given contact expands the seed, relative to the other contacts in u's network.

In accordance with some embodiments, friend suggestions are computed as follows: The user u's egocentric network is extracted from the implicit social graph. The network, G, is represented as a set of contact groups, where each group g∈G is a set of contacts with whom u has exchanged emails. In accordance with some embodiments, each group g has an Interactions Rank, computed as described in greater detail below, indicating the strength of u's connection to the group g. In accordance with some embodiments, EXPANDSEED finds, among all the contacts in G, those contacts whose interactions with u are most similar to u's interactions with the contacts in the seed S.

In accordance with some embodiments, EXPANDSEED iterates over each group g in G, computing a score for each contact c that is a member of g. In some embodiments, the algorithm does not suggest contacts that are already members of the seed S. In some embodiments, scores for each contact are computed iteratively via a helper function, UPDATESCORE, which takes the contact being considered, the contact's score so far, F[c], the seed S, and the group g. It should be understood that a number of distinct scoring functions could be used either separately or in combination as the UPDATESCORE function. Three exemplary scoring functions are described in greater detail below.

Scoring Functions

In accordance with some embodiments, UPDATESCORE is a function template that takes a single contact, c, from a user u's egocentric network, who is a member of an implicit group g, and returns an incremental score based on the group g's similarity to the seed group, S. In these embodiments, the sum of UPDATESCORE for a contact c over all of the implicit groups to which it belongs is an estimate of c's fitness to expand the seed.

An exemplary instantiation of the UPDATESCORE function, shown in Table 2, simply returns a group g's Interactions Rank (abbreviated IR here and elsewhere) if the group has a nonempty intersection with the seed set.

TABLE 2

An implementation of UpdateScore that sums the
scores of all of the groups to which that contact belongs, for
groups that have a non-empty intersection with the seed.

function INTERSECTINGGROUPSCORE(c, $\mathcal{S}$, g):
  input: c, single contact
    $\mathcal{S}$, the seed being expanded
    g, a single contact group
  returns: g's contribution to c's score
  1. if g ∩ $\mathcal{S}$ ≠ ∅
  2.   return $I\mathcal{R}$ (g)
  3. else:
  4.   return 0

It should be understood that the INTERSECTINGGROUPSCORE embodiment of the UPDATESCORE function finds all the contexts in which the proposed contact c exchanged emails or was a co-recipient with at least one seed group member. However, in another embodiment of the UPDATESCORE function, a larger intersection between the members of the seed group and the members of a given implicit group is used to generate a larger contribution to the score for each non-seed member of the implicit group. Table 3 shows a metric, INTERSECTINGWEIGHTEDSCORE, that takes into account the size of the intersection between the members of the seed group and the members of a given implicit group.

TABLE 3

An implementation of UpdateScore that sums the
scores of all groups with a non-empty intersection with the
seed, weighted by the size of the intersection times some
constant k.

function INTERSECTIONWEIGHTEDSCORE(c, $\mathcal{S}$, g):
   input: c, single contact
      $\mathcal{S}$, the seed being expanded
      g, a single contact group
      returns: g's contribution to c's score
    1. return $\mathcal{IR}$ (g) × k|g ∩ $\mathcal{S}$ |

In another embodiment of the UPDATESCORE function, the contribution of an implicit group to a potential friend suggestion (contact c) is determined by a metric, such as INTERSECTINGGROUPCOUNT in Table 4, that simply counts the number of groups a contact c belongs to that have some intersection with the seed S. This metric ignores Interactions Rank entirely, and treats all implicit groups as having equal value to the user.

TABLE 4

An implementation of UpdateScore that counts the
number of groups to which a contact belongs, for groups that
have a non-empty intersection with the seed.

function INTERSECTINGGROUPCOUNT(c, $\mathcal{S}$, g):
   input: c, single contact
      $\mathcal{S}$, the seed being expanded
      g, a single contact group
      returns: g's contribution to c's score
    1. if g ∩ $\mathcal{S}$ ≠ ∅
    2.    return 1
    3. else:
    4.    return 0

In accordance with another embodiment of the UPDATESCORE function, a metric such as TOPCONTACTSCORE shown in Table 5, ignores the seed and always suggests the top-ranked contacts. In other words, when no seed set is provided, the top contacts of the user are suggested. In accordance with some embodiments, these suggested contacts represent the most important contacts of the user. In some embodiments, the top contacts are be used to suggest contacts for a draft message or communication that has not yet been addressed to any contacts. In some embodiments, the top contacts are used to suggest connections in an online social network. In these embodiments, (e.g., where no seed set is provided) contact scores are computed by summing the Interactions Ranks of the implicit groups containing each contact.

TABLE 5

An implementation of UpdateScore that computes the
InteractionsRank of a single contact by summing the scores of
all of the groups to which that contact belongs.

function TOPCONTACTSCORE(c, $\mathcal{S}$, g):
   input: c, single contact
      $\mathcal{S}$, the seed being expanded
      g, a single contact group
      returns: an updated rank for the contact c
    1. return $\mathcal{IR}$ (g)

In other words in some embodiments at a computer system having one or more processors and memory storing one or more programs to be executed by the one or more processors (e.g., server system 106, shown in FIGS. 1 and 2) identifies one or more suggested contacts from a set of contacts associated with a user. The computer system identifies, in historical communications in a user account associated with the user, one or more groups of contacts (e.g., each group of contacts is a group of one or more contacts associated with a particular communication). The computer system generates scores for contacts in the identified groups of contacts, including generating a contact score for a respective contact by accumulating score contributions for a plurality of the identified groups of contacts that include the respective contact (e.g., using the TOPCONTACTSCORE function). The computer system identifies the one or more suggested contacts in accordance with the generated scores (e.g., identifying the contacts that have the top ten scores as calculated using the TOPCONTACTSCORE function). After identifying the one or more suggested contacts, the computer system sends a contact suggestion based on the suggested contacts for display to the user, wherein the contact suggestion includes a suggested contact with a generated score that is above a predefined threshold (e.g., the computer system sends a list of "top contacts" to the user).

In accordance with some embodiments, for one or more of the embodiments of UPDATESCORE described above, the final friend suggestion scores (i.e., "generated scores" as used throughout) are normalized with respect to the highest-ranked contact, so that a single threshold can be used across all users, to cut off the list of suggested contacts.

Suggesting Contacts to Remove

Another embodiment of the Friend Suggest algorithm is for suggesting contacts to remove from a draft message or other communication (e.g., the WRONGBOB algorithm and/or the REMOVECONTACT algorithm described herein). This embodiment addresses the problem of email autocompletion errors. While previous approaches have relied heavily on message content, "Got the wrong Bob" uses the Friend Suggest algorithm to detect the inclusion of contacts in a message that are unlikely to be related to the other recipients. In some embodiments the Friend Suggest algorithm is used to remove or suggest removal of a contact from a draft message or other communication, as illustrated by the discussion of the REMOVECONTACT algorithm below. In some embodiments, the Friend Suggest algorithm is used to replace or suggest replacement of a contact from a draft message or other communication (e.g., by suggesting removal of a first contact and addition of a second contact that is similar to the first contact), as illustrated by the discussion of the WRONGBOB algorithm below.

The exemplary REMOVECONTACT algorithm shown in Table 6 works as follows: From the current recipients of an email that have been entered by the user, the algorithm attempts to find a single contact whose removal would lead to a more coherent recipient list.

TABLE 6

The RemoveContact algorithm which, based on the
user's egocentric network, checks if removing one of the
existing recipients creates a group with a higher score than the
one formed by the existing recipient set.

Function REMOVECONTACT(u, L):
   input: u, the user
      L, a list of the recipients of an email
   returns: c, a contact ∈ L to remove
    1. $score_{max}$ ← 0
    2. $\mathcal{G}$ ← GETGROUPS(u)
    3. if L ∈ $\mathcal{G}$:
    4.    $score_{max}$ ← $\mathcal{IR}$ (L)
    5. wrongRecipient ← null TABLE 6-continued The RemoveContact algorithm which, based on the
user's egocentric network, checks if removing one of the
existing recipients creates a group with a higher score than the
one formed by the existing recipient set.

6. for each contact $c_i \in L$:
    7.      $g \leftarrow L \setminus c_i$
    8.      if $g \in \mathcal{G}$:
    9.          if $\mathcal{IR}(g) > score_{max}$:
    10.            $score_{max} \leftarrow \mathcal{IR}(g)$
    11.            wrongRecipient $\leftarrow c_i$
    12. return wrongRecipient In other words, initially the computer system sets the InteractionsRank (if any) for the current recipients of an email as a maximum score (lines 3-5). Subsequently, for each contact $c_i$ in the current recipient list L, REMOVECONTACT builds a respective seed set (e.g., "g" in line 7) that includes all of the members of L except $c_i$ (lines 6-7). For each respective seed set, the computer system determines an InteractionsRank (if any) for the seed set (line 8) and, if the InteractionsRank for the seed set is greater than the current maximum score (line 9), the InteractionsRank of the seed set is set as the current maximum score and the contact $c_i$ (line 10) that was removed from the current recipient list L is set as the wrongRecipient (line 11). In other words, the computer system determines a highest InteractionsRank between the InteractionsRank of the current recipients, and respective InteractionsRanks for each possible set of contacts that is generated by removing a single contact from the current recipients. The wrongRecipient is returned by the computer system (line 12) and sent to the client as a suggestion for a contact to remove from the communication.

For example, consider the recipient list L={a, b, c} which has an Interactions rank of 5. Assume that: when removing a to create the seed set {b, c}, the InteractionsRank for {b,c} is 2; when removing b to create the seed set {a, c}, the InteractionsRank for {a, c} is 10; and when removing c to create the seed set {a, b}, the InteractionsRank for {a, b} is 8. In this case, because the InteractionsRank for {a, c} is the highest InteractionsRank (e.g., higher than InteractionsRanks for {a, b, c}, {a, b} or {b, c}), the contact b will be identified as the "wrongRecipient" and a suggestion to remove contact b f from the current contact list will be displayed or sent to the client for display.

It should be understood that, in some embodiments, such as when the InteractionsRank for the current recipient list L is higher than the InteractionsRanks for all of the seed sets of contacts, the computer system does not identify a "wrongRecipient" and thus does not provide a suggestion of a contact to remove from the current recipient list L. Additionally, it should be understood that, while the preceding examples have been given with reference to removing a single contact from a current recipient list, analogous techniques could be used to evaluate the removal of more than one contact. For example, an InteractionsRank could be determined for a seed set which was generated by removing two or more contacts from the current recipient list. As another example, if the computer system receives a request to remove one or more of the contacts in the current recipient list (e.g., the "wrongRecipient") the computer system could repeat the process described above with reference to Table 6, starting with a new current recipient list (e.g., a current recipient list that excludes the "wrongRecipient) in order to generate a new "wrongRecipient" based on the new current recipient list.

The exemplary WRONGBOB algorithm shown in Table 7 works as follows: From the current recipients of an email that have been entered by the user, the algorithm attempts to find a single contact whose removal and optionally replacement with another contact from the user u's egocentric network would lead to a more coherent recipient list. For each contact $c_i$ in the current recipient list L, WRONGBOB builds a seed set that includes all of the members of L except $c_i$ (lines 4-5). This seed is expanded via EXPANDSEED to generate a set of contacts that are similar to the current members of the seed. If the excluded contact $c_i$ is a member of the suggestion set and has a score (in the suggestion set) greater than a predefined threshold, it is considered similar to the other recipients and unlikely to be a mistake (lines 7-8).

TABLE 7

The WrongBob algorithm, which checks if a user may
have made an autocompletion error, based on the user Implicit
Social Graph, and checks if one of the existing recipients would
be a good candidate for replacement with another contact.

Function WRONGBOB(u, L):
    input: u, the user
           L, a list of the recipients of an email
    returns: a pair {c,s} where
           c is a contact $\in L$
           s is a suggested contact to replace c
    1. $score_{max} \leftarrow 0$
    2. wrongRecipient $\leftarrow$ null
    3. suggestedContact $\leftarrow$ null
    4. for each contact $c_i \in L$:
    5.     seed $\leftarrow L \setminus c_i$
    6.     results $\leftarrow$ EXPANDSEED(u, seed)
    7.     if $c_i \in$ results and $score(c_i) >$ minScoreForOriginalEmailThresh:
    8.          continue
    9.     for each contact $c_j \in$ results:
    10.          if IsSIMILAR($c_i,c_j$) and $score(c_j) > score_{max}$:
    11.             $score_{max} \leftarrow score(c_j)$
    12.             wrongRecipient $\leftarrow c_i$
    13.             suggestedContact $\leftarrow c_j$
    14. return {wrongRecipient, suggestedContact}

If, however, $c_i$ is not returned as a suggestion from EXPANDSEED with a score greater than a predefined threshold (minScoreForOriginalEmailThresh, e.g., 0 or 0.1) it is a potential mistake. WRONGBOB then searches for another contact that could replace $c_i$. Each contact $c_j$ in the result set returned by EXPANDSEED is compared to the error candidate $c_i$ via a helper function IsSIMILAR. In some embodiments, similarity is measured by checking to see if $c_j$ was listed as an autocomplete suggestion at the time that the user entered the contact $c_i$. If $c_i$ and $c_j$ are similar, and $c_j$'s score as a member of the seed expansion is higher than the current maximum, $c_i$ and $c_j$ are saved as the current candidate pair (lines 10-13). After examining all contacts in L, the candidate pair (e.g., Contact A and Contact B) with the highest score is returned and displayed to the used as "Did you mean Contact A instead of Contact B"?

For example, consider the recipient list L={a, b, c}. Assume that when removing a to create the seed list {b, c}, EXPANDSEED generates the suggestion set {a, d}. In this case, because the excluded contact a is a member of the suggestion set, WRONGBOB determines that it is not a mistake. Then, when removing b, if the algorithm observes {b', d}, where b' is similar to b but d is not, the algorithm will consider {b, b'} as candidates for replacement. If, after removing c, the algorithm generates another candidate pair {c, c'}, then it will return the pair with the highest score.

Figure 4A:
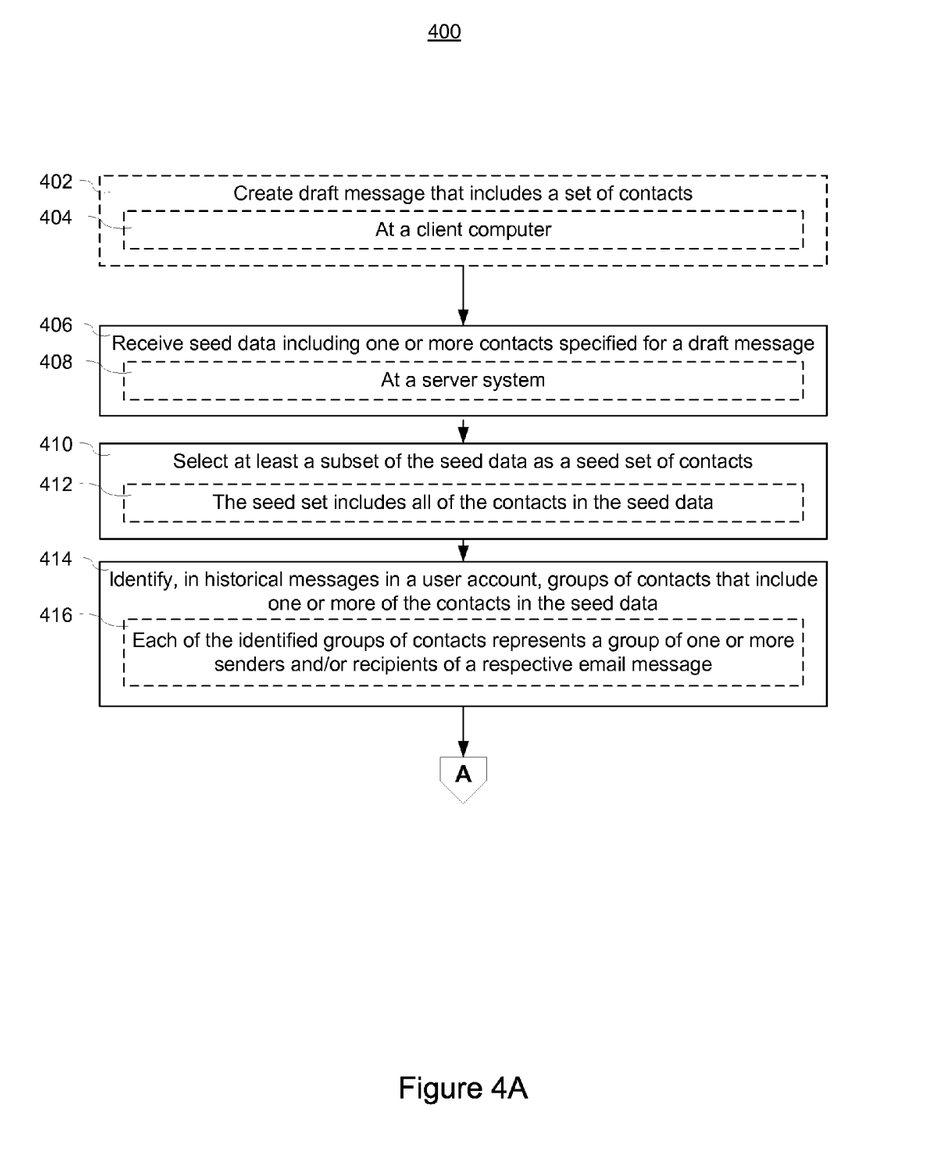
FIGS. 4A-4C are a flow diagram of a process for generating a contact suggestion for a draft message based on previously added contacts in accordance with some embodiments.
Figure 4B:
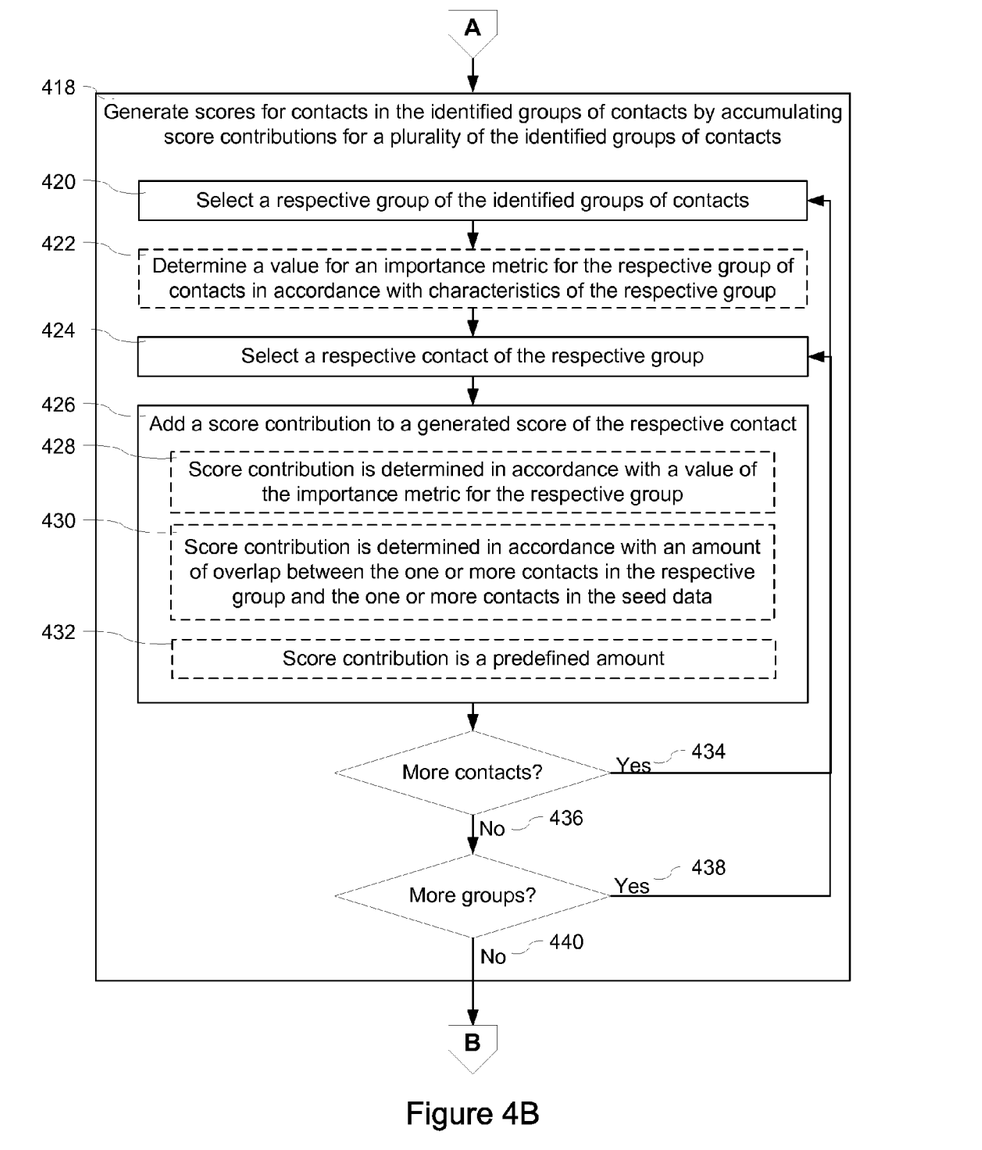
Figure 4C:
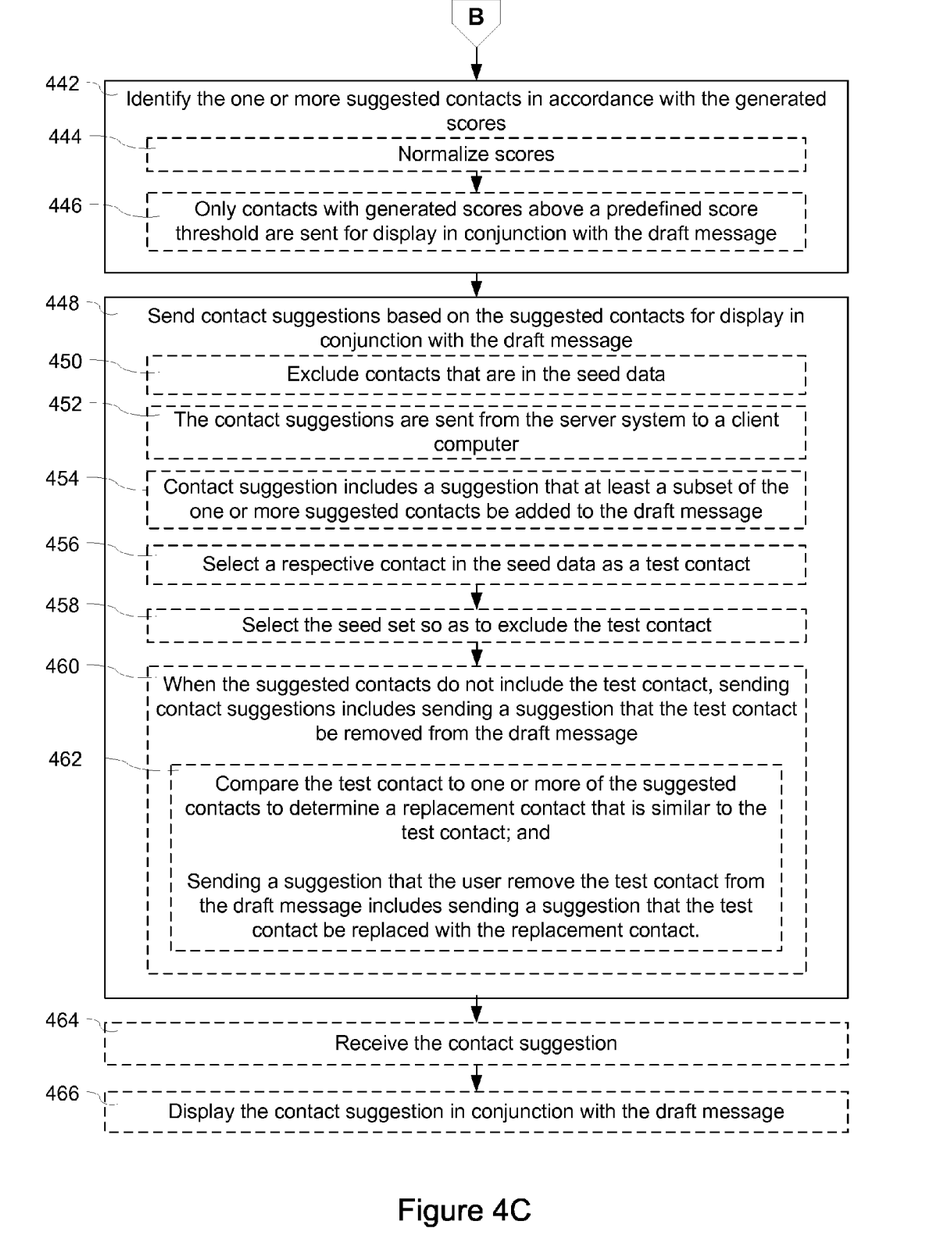

Attention is now directed towards FIGS. 4A-4C, which illustrate a method 400 for generating contact suggestions. In some embodiments a draft message is created (402), where the draft message specifies one or more contacts (e.g., as recipients). In some embodiments the draft message is (404) created at a client computer (e.g., client computer 102, FIGS. 1 and 3).

A computer system receives (406) seed data comprising a set of one or more contacts specified for a draft message. In some embodiments, the computer system is (408) a server system (e.g., server system 106, shown in FIGS. 1 and 2). In some embodiments, the seed data is received at the server system from a client computer that is remote from the server system. In some embodiments one or more of these operations is performed on the client computer.

The computer system selects (410) at least a subset of the seed data as a seed set of contacts. In some embodiments, the seed set includes (412) all of the contacts in the seed data.

The computer system identifies one or more suggested contacts based on the seed set by performing at least some of the operations 414-442 described below. The computer system identifies (414) in historical messages in a user account, groups of contacts that include one or more of the contacts in the seed set. In some embodiments, each of the identified groups of contacts represents (416) a group of one or more senders and or recipients of a respective email message.

The computer system generates (418) scores for contacts in the identified groups of contacts. A contact score for a respective contact is generated by accumulating score contributions for a plurality of the identified groups of contacts that include the respective contact (e.g., using the process described with reference to operations 420-440 below).

In some embodiments, the computer system iterates through the groups of contacts by selecting (420) a respective group of the identified groups of contacts. In some embodiments, the computer system determines (422) a value for an importance metric for the respective group in accordance with characteristics of the respective group. In some embodiments the computer system iterates through the contacts in the respective group of contacts (424). Optionally, since there is no need to suggest contacts already in the seed set of contacts, when selecting a next contact at operation 424, the computer system excludes contacts in the seed set of contacts from the computation of contact scores. For a respective contact in the group, the computer system adds (426) a score contribution to a contact score (e.g., the generated score) for the respective contact. A few embodiments of functions for determining the score contributions were described above (e.g., the UPDATESCORE functions).

In some embodiments, a respective score contribution for a respective group of the identified groups of contacts is (428) determined in accordance with a value of an importance metric for the respective group. A few embodiments of functions for determining the importance metric were described above (e.g., the interactions rank discussed above). In some embodiments, a respective score contribution for a respective group of the identified groups of contacts is (430) determined in accordance with an amount of overlap between the one or more contacts in the respective group and the one or more contacts in the seed data. In some other embodiments, a respective score contribution for a respective group of the identified groups of contacts is (432) a predefined amount.

For the respective group of contacts, if there are (434) more contacts in the respective group of contacts, then the computer system returns to operation 424 and selects a different respective contact of the respective group of contacts. If there are no more contacts (436) in the respective group of contacts, the computer system checks to see if there are more groups of the identified groups of contacts. If there are (438) more groups of contacts of the identified groups of contacts, then the computer system returns to operation 420 and selects a different respective group of contacts of the identified groups of contacts. If there are no more groups of contacts (440) in the identified groups of contacts, the score generation process ends.

Once the score generation process is complete, the computer system identifies (442) the one or more suggested contacts in accordance with the generated scores. In some embodiments, the generated scores are normalized (444) based on the highest score of any of the contacts. In some embodiments, only contacts with generated scores above a predefined score threshold are sent (446) for display in conjunction with the draft message. In some embodiments only a predefined number of contacts are sent for display (e.g., the four contacts with the top scores that are not in the seed data).

The computer system sends (448) a contact suggestion based on the suggested contacts for display in conjunction with the draft message. In some embodiments, the computer system excludes (450) contacts that are in the seed data (e.g., contacts that are already associated with the message do not need to be suggested). In embodiments in which contact suggestions are generated by a server system that is distinct from a client computer, sending a contact suggestion includes sending (452) the contact suggestion from the server system to a client computer. In some embodiments the contact suggestion includes one or more contacts to add to the draft message. In some embodiments the contact suggestion includes one or more contacts to remove from the draft message.

Optionally, sending a contact suggestion includes sending (454) a suggestion that the user add at least a subset of the one or more suggested contacts to the draft message.

In some embodiments, the computer system selects (456) a respective contact in the seed data as a test contact. In these embodiments, the computer system also selects (458) the seed set of contacts so as to exclude the test contact. In these embodiments, when the suggested contacts do not include the test contact, operation 448 (sending a contact suggestion) includes sending (460) a suggestion that the user remove the test contact from the draft message.

In some embodiments, when the suggested contacts do not include the test contact, the computer system compares (462) the test contact to one or more of the suggested contacts to determine a replacement contact that is similar to the test contact. In these embodiments, sending a suggestion that the user remove the test contact from the draft message includes sending a suggestion that the user replace the test contact with the replacement contact. In some embodiments, determining the replacement contact includes identifying a set of matching contacts in the one or more suggested contacts that are similar to the test contact and identifying a contact from the set of matching contacts that has a highest generated score of the contacts in the set of matching contacts as the replacement contact.

In some embodiments, a computer system (e.g., the client computer 102) receives (464) the contact suggestion, and displays (466) the contact suggestion in conjunction with the draft message.

FIGS. 4A-4C is a flowchart representing a method 400 for generating contact suggestions, according to certain embodiments of the present disclosure. Method 400 (excluding operations performed at the client computer) may be governed by instructions that are stored in a computer readable storage medium and that are executed by one or more processors of one or more servers. Each of the operations shown in FIGS. 4A-4C may correspond to instructions (e.g., instructions in the Contact Suggestion Generator 128 in server system 106, shown in FIG. 2, or instructions in the Contact Suggestion Generator 328 and/or client application 104 in client computer 102, shown in FIG. 3) stored in computer memory (e.g., memory 206 of server system 106, or memory 306 or client computer 102) or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

APPLICATIONS

Figure 5A:
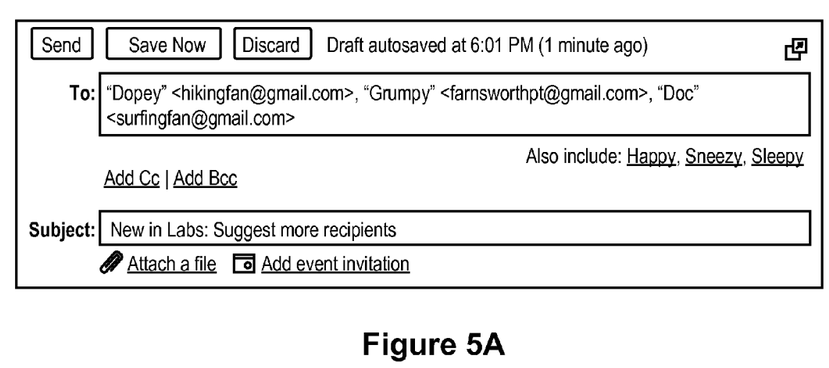
FIG. 5A is an exemplary screenshot of a user interface for displaying contact suggestions for adding contacts to a draft message.
Figure 5B:
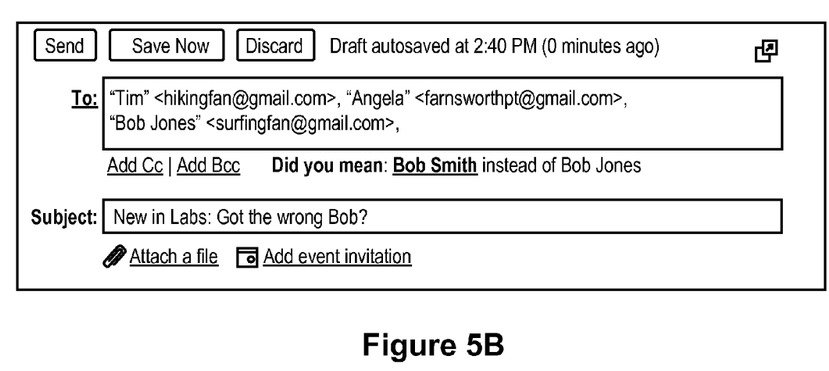
FIG. 5B is an exemplary screenshot of a user interface for displaying contact suggestions for removing contacts from a draft message.

In accordance with some embodiments the Friend Suggest algorithm is used to suggest contacts to add to and/or remove from draft email messages as illustrated in the exemplary graphical user interfaces shown in FIGS. 5A-5B.

"Don't forget Bob" (e.g., the exemplary user interface illustrated in FIG. 5A) is a straightforward user interface on top of the Friend Suggestion algorithm. As seen in FIG. 5A, "Don't forget Bob" operates when a user is composing an email message. In accordance with some embodiments, the user interface treats the first contacts added by the user as the seed set (e.g., all of the seed data is selected as the seed set), and uses them to generate a set of possible suggested recipients that the user may wish to add to the email. Once the user has added at least two contacts, the application queries the implicit social graph to fetch the user's egocentric network (e.g., as described in greater detail above with reference to FIGS. 4A-4C), and uses Friend Suggest to generate up to four contacts who best expand the seed set of existing contacts. These contacts are displayed as clickable links below the "To:" input field. If the user clicks on a suggestion, it is added to the list of recipients, and a new set of suggestions is generated.

Another exemplary graphical user interface (e.g., the "Got the wrong Bob?" lab) is illustrated in FIG. 5B, and shows a graphical user interface for displaying contact suggestions for removing contacts from a draft message.

It should be understood that, although many of the embodiments described above were described with reference to email interactions, the algorithms and approaches described herein apply to any interaction-based social network (e.g., an email system, an announcement system, a photo sharing system, a document sharing system, instant messaging chats system, an online calendar meeting invitation system, or comments on blog posts). It should be understood that even offline interactions, such as mobile text messages or telephone calls, form an implicit social graph between individuals and groups. In accordance with some embodiments, the relative importance of different interaction types is also taken into account in determining the social relationships between individuals. One skilled in the art would readily understand from the examples and explanations provided in this document that the Friend Suggest algorithm is also applicable to other applications, such as identifying trusted recommenders for online recommendation systems, or improving content sharing between users in various online contexts.

What is claimed is:

1. A method of generating a contact suggestion, comprising:
    at a computing device having one or more processors and memory storing one or more programs to be executed by the one or more processors to perform the method, wherein the method comprises:
    identifying a first recipient of a draft electronic communication prepared by a user;
    obtaining a score for a second recipient based at least in part on a number of respective messages in a plurality of historical messages in a user account associated with the user, wherein
        the second recipient is a sender or receiver of the respective messages, and
        the obtaining giving more score weight to individual messages in the respective messages originating from the first recipient and received by the second recipient than individual messages in the respective messages from the second recipient to the first recipient; and
    suggesting, to the user, the second recipient for the draft electronic communication in accordance with
        a first condition that both the first recipient and the second recipient shared at least one single message in the respective messages; and
        a second condition that the obtained score for the second recipient satisfies a predefined score threshold, wherein the at least one single message was communicated at a time prior to identifying the first recipient.

2. The method of claim 1, further comprising:
    suggesting, to the user, a removal of a third recipient of the draft electronic communication in accordance with a determination that removal of the third recipient improves the score of the second recipient.

3. The method of claim 1, further comprising:
    suggesting, to the user, a replacement of the first recipient with the second recipient in accordance with the condition that both the first recipient and the second recipient are listed as autocomplete suggestions at a time when the user entered the first recipient and wherein the score for the second recipient is greater than a score for the first recipient obtained using the plurality of historical messages.

4. The method of claim 1, wherein the draft electronic communication is one of: an email message, a chat message, a voicemail message, a calendar invitation, a document sharing invitation, a document sharing communication, a video communication, a social network communication.

5. The method of claim 1, wherein the second recipient is suggested further in accordance with a direction of a single message of the at least one single message.

6. The method of claim 1, wherein the second recipient is suggested further in accordance with a date of transmission of a single message of the at least one single message, wherein a contribution of the single message to the score is weighted by an interaction weight that decays over time.

7. The method of claim 1, wherein the second recipient is suggested further in accordance with a frequency of communication between the first recipient and the second recipient.

8. The method of claim 1, wherein the second recipient is suggested further in accordance with an importance level associated with the second recipient.

9. The method of claim 1, further comprising:
suggesting a third recipient concurrently with the second recipient.

10. The method of claim 1, wherein a single message of the at least one single message is a different type of communication from the draft electronic communication.

11. The method of claim 1, further comprising:
causing (i) information identifying the second recipient to be displayed concurrently with (ii) a portion of the draft electronic communication.

12. The method of claim 1, wherein the first recipient is specified by the user.

13. The method of claim 1, wherein second recipient is suggested to the user automatically without human intervention.

14. A computing device for generating a contact suggestion, comprising:
one or more processors and memory, wherein at least one of the one or more processors and the memory is implemented at least partially by hardware;
one or more programs stored in the memory, the one or more programs comprising instructions, executed by the one or more processors, for:
identifying a first recipient of a draft electronic communication prepared by a user;
obtaining a score for a second recipient based at least in part on a number of respective messages in a plurality of historical messages in a user account associated with the user, wherein
the second recipient is a sender or receiver of the respective messages, and
the obtaining giving more score weight to individual messages in the respective messages originating from the first recipient and received by the second recipient than individual messages in the respective messages from the second recipient to the first recipient; and
suggesting, to the user, the second recipient for the draft electronic communication in accordance with
a first condition that both the first recipient and the second recipient shared at least one single message in the respective messages; and
a second condition that the obtained score for the second recipient satisfies a predefined score threshold, wherein the at least one single message was communicated at a time prior to identifying the first recipient.

15. The computing device of claim 14, wherein the second recipient is suggested further in accordance with a direction of a single message of the at least one single message.

16. The computing device of claim 14, wherein the second recipient is suggested further in accordance with a date of transmission of a single message of the at least one single message, wherein a contribution of the single message to the score is weighted by an interaction weight that decays over time.

17. The computing device of claim 14, wherein a single message of the at least one single message is a different type of communication from the draft electronic communication.

18. The computing device of claim 14, wherein the one or more programs further comprise instructions for:
causing (i) information identifying the second recipient to be displayed concurrently with (ii) a portion of the draft electronic communication.

19. The computing device of claim 14, wherein the first recipient is specified by the user.

20. A non-transitory computer readable storage medium storing one or more programs configured for execution by one or more processors of a computing device, the one or more programs comprising instructions to be executed by the one or more processors so as to:
identify a first recipient of a draft electronic communication prepared by a user;
obtain a score for a second recipient based at least in part on a number of respective messages in a plurality of historical messages in a user account associated with the user, wherein
the second recipient is a sender or receiver of the respective messages, and
the instructions to obtain giving more score weight to individual messages in the respective messages originating from the first recipient and received by the second recipient than individual messages in the respective messages from the second recipient to the first recipient; and
suggest, to the user, the second recipient for the draft electronic communication in accordance with
a first condition that both the first recipient and the second recipient shared at least one single message in the respective messages; and
a second condition that the obtained score for the second recipient satisfies a predefined score threshold, wherein the at least one single message was communicated at a time prior to identifying the first recipient.

* * * * *